2,775,626

PRODUCTION OF 1-ETHYNYL-2,6,6-TRIMETHYL-CYCLOHEX-1-ENE

Kurt H. Schaaf and Roland Kapp, Newark, N. J., assignors to Nopco Chemical Company, Harrison, N. J., a corporation of New Jersey No Drawing. Application November 4, 1953,
Serial No. 390,244

9 Claims. (Cl. 260—666)

This invention relates to the production of 1-ethynyl-2,6,6 - trimethylcyclohex - 1 - ene from 1 - ethynyl - 2, - 6,6-trimethylcyclohexan-1-ol.

1 - ethynyl - 2,6,6 - trimethylcyclohex - 1 - ene is a highly useful intermediate for the production of vitamin A and 8,9-dehydrovitamin A (see Milas et al.: J. Am. Chem. Soc. 70, 1829–34 (1948); Sobotka and Chanley: J. Am. Chem. Soc. 71, 4136–9 (1949); and Attenburrow et al.: J. Chem. Soc. 1952, 1094–1111).

The prior art procedures for preparing this material have involved the dehydration of 1-ethynyl-2,6,6-trimethylcyclohexan-1-ol. However, the prior art methods for carrying out this reaction have been far from satisfactory since low yields have been obtained, rarely exceeding about 25% of theory and in many cases being much less than that, and often the products which have been obtained have not been of the desired purity. In view of the importance of this material for the synthesis of vitamin A, a need exists for a satisfactory procedure for preparing the compound in relatively high yields and by relatively simple means.

It is the object of this invention to provide a highly improved procedure for the dehydration of 1-ethynyl-2,-6,6 - trimethylcyclohexan - 1 - ol to form 1 - ethynyl - 2,6,6-trimethylcyclohex-1-ene.

It has been discovered that the object of the invention can be very readily and efficiently accomplished by heating a solution of 1-ethynyl-2,6,6-trimethylcyclohexan-1-ol in an aromatic or aliphatic hydrocarbon solvent in the presence of cupric sulfate, the heating being at the reflux temperature of the solvent. The procedure is a very simple one and provides very high yields of the desired product with in most cases the yields being of the order of 75% or more of theory with a very high quality product being produced.

The solvents which are employed in carrying out the reaction are aromatic and aliphatic hydrocarbon solvents having boiling points of at least about 120° C. and preferably not in excess of about 250° C. Examples of aromatic and aliphatic hydrocarbon solvents useful for carrying out the process of the invention are xylene, trimethylbenzene, ethylbenzene, diethylbenzene, triethylbenzene, isopropylbenzene, propylbenzene, diisopropylbenzene, nonane, decane, undecane, dodecane, and mixtures of any one or more of these solvents. The amount of solvent which is required is not at all critical although it must be sufficient, of course, to permit the reaction mixture to be refluxed and to allow for the water formed in the dehydration reaction to be distilled in an azeotropic mixture with the solvent and allow for the water to be removed from the distillate by a Stark-Dean trap or a similar apparatus. Preferably we employ at least about five parts by volume of solvent for each part by weight of the hexanol compound and preferably we employ about ten parts by volume of solvent for each part by weight of the hexanol compound. Larger ratios of solvent can be employed, if desired, but no useful purpose is served by doing so.

The cupric sulfate which is employed as the dehydration catalyst may be either the cupric sulfate pentahydrate or the reagent grade cupric sulfate which when purchased will normally contain about 1% of water but which on standing may absorb sufficient moisture from the atmosphere to become the cupric sulfate monohydrate. Cupric sulfate pentahydrate loses four molecules of water when heated at 110° C. and, therefore, under the conditions of our reaction if the cupric sulfate pentahydrate has been employed, a part of the water associated therewith will be removed during the reaction. Preferably, however, we employ cupric sulfate which has had the bulk of the moisture removed therefrom prior to being admixed with the reaction mixture. The amount of cupric sulfate which is employed is normally about one part by weight for each ten parts by weight of the cyclohexanol compound. Larger amounts, e. g. one part for each five parts of the cyclohexanol compound, may be employed, but the rate of dehydration does not appear to be substantially accelerated by the use of larger amounts of the cupric sulfate. Smaller amounts of cupric sulfate, e. g. one part for each twenty parts of the cyclohexanol compound, may be employed but this may tend to slow down the rate of dehydration, and, therefore, it is preferred that the larger amounts of cupric sulfate be utilized.

We have found that our novel process will very effectively dehydrate either the alpha or the beta form of the cyclohexanol compound. It appears, however, that the alpha form of the cyclohexanol compound dehydrates more readily than the beta form since our yields when the alpha form has been employed have been in the neighborhood of 75% of theory, whereas when the beta form of the cyclohexanol compound has been used the yields have been in the neighborhood of 55% of theory. Consequently, we prefer, when possible, to employ the relatively pure alpha form of the cyclohexanol compound for carrying out our reaction. Furthermore, as pointed out by Sobotka and Chanley, J. Am. Chem. Soc. 71, 4136–9 (1949), the beta form of the cyclohexanol compound tends to undergo rearrangement when it is dehydrated thus giving an end product which is not entirely the desired cyclohexene compound. We do want to emphasize, however, that as far as the step of dehydrating the beta form of the cyclohexanol compound is concerned our procedure does do a much more effective job of dehydration than the prior art procedures as is clearly shown by the amount of water which we recover when dehydrating the beta form of the cyclohexanol compound. Consequently our procedure is very useful for the dehydration of the beta form alone or, if desired, a mixture of the alpha and beta forms of the cyclohexanol compound can be dehydrated by our novel procedure.

In carrying out the reaction, the cyclohexanol compound is dissolved in the hydrocarbon solvent and the cupric sulfate is mixed therewith. The reaction mixture is heated to reflux in a suitable apparatus for removing the water of dehydration from the azeotropic distillate which forms. Thus in small scale operations such as in the laboratory the commercially used Stark-Dean trap is utilized to remove the water from the distillate. In most cases it will be found that substantially all the water of dehydration will have been removed in about 3½ to 4 hours of refluxing. In any event, however, the required reaction time can readily be determined merely by observing the level of water in the trap and determining how the amount of water collected compares with the theoretical quantity of water which should be produced by the reaction. We have found that in most cases the reaction will have reached substantial completion by the time about 85% to 95% of the theoretical amount of water has been collected. On completion of the reaction, the cupric sulfate is removed from the reaction mixture by filtration or other similar means and is preferably washed with small portions of hydrocarbon solvent to remove any adsorbed cyclohexene compound. The distillate and the solvent used in washing the cupric sulfate are combined and the solvent is then removed from the reaction mixture by conventional fractional distillation means. (Obviously, of course, the hydrocarbon solvent and the cupric sulfate can be used repeatedly and as a result the procedure is a very economical one.) The crude cyclohexene compound is then distilled under low pressure in order to obtain the purified compound. Since the desired product is subject to oxidation, it is preferred that the dehydration reaction be carried out in a nitrogen atmosphere. In carrying out the distillation of the desired product after removal of the hydrocarbon solvent, it will be found that the bulk of the hexene compound will distill at a temperature range of about 65° to 75° C. at a pressure of 18 mm. Hg. A small portion of the product will distill at a temperature range of from about 70–80° C. at a pressure of about 1.5 to 11 mm. Hg. This high boiling fraction is probably a mixture of about equal amounts of the hexene compound and the hexanol compound and may be combined with untreated hexanol compound for treatment in subsequent reactions.

For a fuller understanding of the nature and objects of the invention, reference may be had to the following examples which are given merely for purposes of illustration and are not to be construed in a limiting sense:

*Example I*

16.63 gm. (0.1 mole) of the alpha form of 1-ethynyl-2,6,6-trimethylcyclohexan-1-ol were dissolved in 166.3 ml. of commercial xylene. To the solution there were added 1.66 gm. of analytical grade cupric sulfate (cupric sulfate monohydrate) and the mixture was then refluxed for four hours in the dark in a nitrogen atmosphere using a Stark-Dean trap to collect the water formed by the dehydration reaction. A total of 1.40 ml. of water (78% of theory) was collected and a small amount of water clung to the condenser. In addition the cupric sulfate turned green during the course of the reaction, showing that it had combined with part of the water formed by the dehydration reaction. The cupric sulfate was filtered from the reaction mixture and washed with two 25 ml. portions of xylene. The xylene solutions were combined and then fractionally distilled in a $N_2$ atmosphere using a 10 cm. long modified Vigreux fractionating column for the removal of the xylene. When the xylene had all been removed, the column was replaced with a short still head and the distillation resumed at a pressure of 18 mm. of Hg. 8.68 gm. of colorless liquid were collected at a temperature range of 66–74.5° C. and a pressure range of 17–18 mm. Hg. A second fraction, 2.44 gm. of colorless liquid, was collected at 10 mm. Hg. and a temperature range of 64–72° C. The first fraction had $n_D^{14}$ of 1.4941 and the second fraction had $n_D^{14}$ of 1.4909. The total yield was 75% theory (58.5% in the first fraction).

*Example II*

33.3 gm. (0.2 mole) of the alpha form of 1-ethynyl-2,6,6-trimethylcyclohexan-1-ol were dissolved in 333 ml. of commercial xylene (B. P. 138–148° C.) and 3.33 gm. of analytical grade cupric sulfate (cupric sulfate monohydrate) added to the solution. The mixture was refluxed in a nitrogen atmosphere for 4½ hours using a Stark-Dean trap to collect the water formed in the reaction. 2.97 ml. of water (82.5% of theory) were collected. The reaction mixture was then treated as in the previous example. Two fractions, 20.1 gm. and 3.0 gm., were collected as in Example I using a pressure range of 13 to 24 mm. Hg. for the first fraction and 1 to 11 mm. for the second. Both fractions were colorless liquids; the first having $n_D^{14}$ of 1.4953 and the second having $n_D^{14}$ of 1.4861. 1.40 gm. of dark brown amber resin remained in the distillation vessel. The yield was 78% of theory (68% in the first fraction). The refractive index of the second fraction indicates that this fraction was a mixture of the desired cyclohexene compound and unreacted cyclohexanol compound.

*Example III*

33.3 gm. of the beta form of 1-ethynyl-2,6,6-trimethylcyclohexan-1-ol were added to 333 ml. of xylene and then 3.33 gm. of reagent grade cupric sulfate added thereto. The mixture was refluxed for 10 hours under the same conditions as in the previous examples. 2.32 ml. of water—64.5% of theory—were collected. Since approximately 80% of the theoretical yield of water is obtained from the alpha form of the carbinol, it is apparent that the alpha form dehydrates more readily than the beta form. The cyclohexene compound was recovered as in the previous examples. 13.88 gm. of a colorless liquid were recovered at 18 mm. Hg. and in a temperature range of 65–75° C. It had $n_D^{14}$ of 1.4876. The yield was 47% of theory. An additional 1.73 gm. were obtained at a pressure range of 2 to 10 mm. and a temperature range of 35.5–55° C. It had $n_D^{14}$ of 1.4933. This made a total yield of 53%. It was apparent, however, from the refractive index and boiling point of each of the two fractions that the end product was not entirely the desired cyclohexene compound and that some rearrangement had taken place during the dehydration.

*Example IV*

Example I was repeated replacing the xylene with commercial toluene and using a reflux time of 15 hours. At the end of the 15 hours only one-third of the theoretical amount of water had been produced. In view of the low yield as compared to the reaction using xylene, the reaction mixture was not worked up to recover the cyclohexene compound. Since toluene has a boiling point of about 110° C., it is apparent that temperatures somewhat above 110° C. are required in the dehydration reaction in order to provide the most effective reaction conditions.

*Example V*

Example II was repeated using a reflux time of 4 hours. 3.10 ml. of water (86% of theory) were collected. In addition the cupric sulfate turned green during the course of the reaction showing that it had combined with part of the water formed by the dehydration reaction. The xylene was removed as in the previous examples and the product fractionally distilled. 21.21 gm. of product which was a colorless liquid having a B. P. of 66–75° C. at 18 mm. Hg. and $n_D^{14}$ of 1.4955 were collected. This was 71.5% of the theoretical yield. A second fraction of 1.51 gm. of pale amber liquid was collected at a pressure range of 1.5–9 mm. Hg. and a temperature range of 56–79° C. $n_D^{14}$ of this fraction was 1.4971. The total yield was 76.7% of theory.

*Example VI*

Example II was repeated using an "Ace" stirrer in place of the propeller type stirrer used in Example II. 3.25 ml. of water (90.5% of theory) were collected. The slightly larger amount of water recovered was probably the result of more efficient stirring obtained by the use of the "Ace" stirrer. Recovery of the product was carried out as before. 0.97 gm. of a colorless liquid was collected at 18 mm. Hg. and a temperature range of 44–65° C. $n_D^{14}$ of this fraction was 1.4975. 20.12 gm. of a colorless liquid were collected at 18 mm. Hg. and a temperature range of 66–72° C. $n_D^{14}$ of this fraction was 1.4958. A third fraction made up of 1.63 gm. of colorless liquid was collected at a pressure range of 1.5–10.5 mm. Hg. and a temperature range of 35–56° C. This was a total yield of 76.7% with 68.4% being in the second fraction.

Example VII 100.8 gm. of the alpha form of 1-ethynyl-2,6,6-trimethylcyclohexan-1-ol were dissolved in 500 ml. of distilled commercial xylene and 10 gm. of powdered cupric sulfate monohydrate were added. The mixture was heated at reflux temperature in a nitrogen atmosphere with stirring for 5¾ hours with a Stark-Dean trap being used to collect the water. 10.5 ml. (95.8% of theory) of water were collected. The reaction mixture was cooled to room temperature, the cupric sulfate filtered off and washed with two 25 ml. portions of xylene and the combined filtrates fractionally distilled under reduced pressure. After the xylene had been removed, 67.9 gm. of 1-ethynyl-2,6,6-trimethylcyclohex-1-ene having $n_D^{14}$ of 1.4957 were collected at a temperature of 66–76° C. under a pressure of 18 mm. Hg. This was a yield of 75.4% of theory. No second fraction was obtained as in the previous examples.

Example VIII 33.3 gm. of 1-ethynyl-2,6,6-trimethylcyclohexan-1-ol were dissolved in 333 ml. of an aliphatic hydrocarbon solvent having a B. P. of 130–143° C. obtained by fractionally distilling commercial naphtha to give the desired fraction. The solvent was predominantly nonane. 3.33 gm. of cupric sulfate monohydrate were added to the mixture and the mixture refluxed under a nitrogen atmosphere as in the previous examples for 5 hours. 3.0 ml. of water were collected (83.4% of theory). After the reaction mixture was cooled, the cupric sulfate was filtered off and washed with two 20 ml. portions of the aliphatic hydrocarbon solvent. The filtrate was then fractionally distilled under reduced pressure and after the solvent had been removed the desired cyclohexene compound was recovered in two fractions. The first fraction which amounted to 23.36 gm. (78.7% of theory) was collected at a temperature of 66–76° C. and a pressure of 18 mm. Hg. It had $n_D^{14}$ of 1.4917. The second fraction amounting to 0.55 gm. (1.85% of theory) was collected at a temperature of 61–68° C. at a pressure of 13 mm. Hg. It had $n_D^{14}$ of 1.4925. The alpha form of the hexanol compound was used in this example.

The main fractions from Examples II and VI, i. e. the first fraction of Example II and the second fraction of Example VI, were converted to 8,9-dehydrovitamin A by the procedure of Attenburrow et al., J. Chem. Soc. 1952, 1094–1111. The physical constants of the product obtained in each case coincided with the physical constants reported by Attenburrow et al. for 8,9-dehydrovitamin A.

Having described our invention, what we claim as new and desire to secure by Letters Patent is:

1. A process comprising heating a hydrocarbon solvent solution of 1-ethynyl-2,6,6-trimethylcyclohexan-1-ol at the reflux temperature of the solvent in the presence of cupric sulfate, the hydrocarbon solvent being selected from the group consisting of aromatic and aliphatic hydrocarbon solvents having a boiling point between about 120° C. and about 250° C.

2. A process comprising heating an aromatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C.

3. A process comprising heating an aliphatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C.

4. A process comprising heating an aromatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C., with one part by weight of cupric sulfate (calculated as cupric sulfate monohydrate) being employed for each five to twenty parts by weight of the hexanol compound and with at least five parts by volume of solvent being employed for each part by weight of the hexanol compound.

5. A process comprising heating an aliphatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C., with one part by weight of cupric sulfate (calculated as cupric sulfate monohydrate) being employed for each five to twenty parts by weight of the hexanol compound and with at least five parts by volume of solvent being employed for each part by weight of the hexanol compound.

6. A process comprising heating an aromatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C., with about one part by weight of cupric sulfate (calculated as cupric sulfate monohydrate) being employed for each ten parts by weight of hexanol compound and with about ten parts by volume of solvent being employed for each part by weight of the hexanol compound.

7. The process of claim 6 wherein the solvent has a boiling point between about 135° C., and 150° C.

8. A process comprising heating an aliphatic hydrocarbon solvent solution of 1-ethynyl-2,6,6-trimethylcyclohexan-1-ol at the reflux temperature of the solvent in the presence of cupric sulfate, the solvent having a boiling point between about 120° C. and about 250° C., with about one part by weight of cupric sulfate (calculated as cupric sulfate monohydrate) being employed for each ten parts by weight of hexanol compound and with about ten parts by volume of solvent being employed for each part by weight of the hexanol compound.

9. The process of claim 8 wherein the solvent has a boiling point between about 130° C. and 150° C.

References Cited in the file of this patent
UNITED STATES PATENTS

| | | |
|---|---|---|
| 1,069,422 | Hofmann et al. | Aug. 5, 1913 |
| 2,310,809 | Reppe et al. | Feb. 9, 1943 |

OTHER REFERENCES

Faraday's Encyclopedia of Hydrocarbon Compounds, vol. 8 ($C_{11}H_{8-16}$), page 11175.50.11.